March 16, 1948.  J. ROSE  2,437,922

ROTOR FOR SYNCHRONOUS ELECTRIC MOTORS

Filed April 15, 1947

INVENTOR
Jay Rose
BY
Ivan E. A. Konigsberg
ATTORNEY

Patented Mar. 16, 1948

2,437,922

UNITED STATES PATENT OFFICE 2,437,922

ROTOR FOR SYNCHRONOUS ELECTRIC MOTORS

Jay Rose, New York, N. Y.

Application April 15, 1947, Serial No. 741,615

1 Claim. (Cl. 172—120)

This invention relates to improvements in synchronous electric motors especially well adapted for operating timing mechanisms. The object of the invention is to provide certain improvements in the manufacture and assembly of the rotor elements whereby savings in labor and material may be effected and a more efficient rotor element provided. The invention is embodied in a synchronous electric motor arranged and constructed as hereinafter set forth and as illustrated in the accompanying drawing in which Fig. 1 is a face view of a motor embodying the invention.

Figure 1:
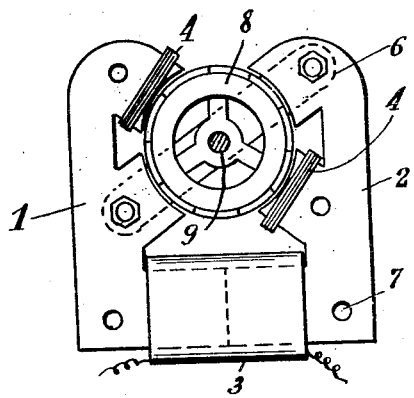
Figure 2:
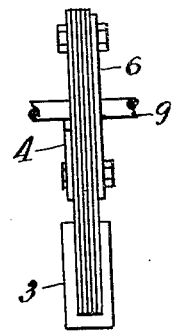
Fig. 2 is a side view.

The motor comprises the stator 1, 2 having the coil 3 and provided with copper laminae 4, 4 forming the usual Sheridan bridge. The two legs of the stator are held together by any suitable framework such as indicated at 6. 7 indicates bolt holes for mounting the motor on the framework of the mechanism to which the motor is to be attached, such framework not being shown. The rotor 8 is mounted upon and drives a shaft 9 which in turn will drive such mechanism. The stator is constructed of laminae as shown.

Figure 4:
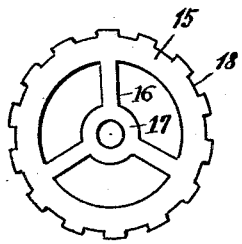
Fig. 4 is a view of one of the laminae.
Figure 6:
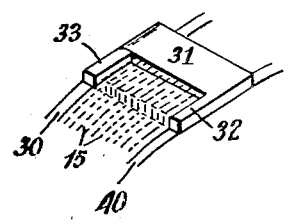
Fig. 6 is a detail view in perspective of a part of the holding means for the laminae.

The rotor 8 consists of as many laminae as may be required for the work to be performed. Each lamina is in the form of a disk or wheel, Fig. 4, having a rim 15, spokes 16 and a hub 17. The rim is formed with a plurality of recesses 18 with teeth therebetween. The recesses form slots axially across the laminae when they are assembled.

Figure 3:
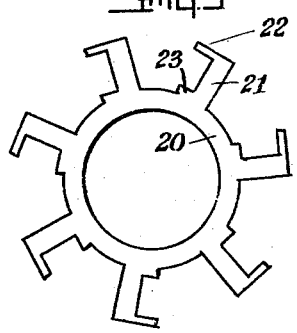
Fig. 3 is a view of the outside copper disk of the rotor which serves to hold the rotor laminae together.

The laminae are held together by two outside copper disks or rings such as shown in Fig. 3. The shape and arrangement of the copper rings form a feature of this invention. Each ring comprises a circular rim 20 having radial arms 21 extending therefrom. Each arm terminates in a holding tooth 22 positioned at right angles to the arm. At the base of the arm there is an abutment 23.

Figure 5:
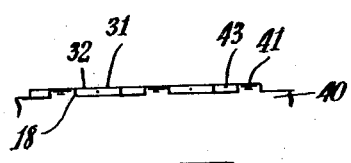
Fig. 5 is a schematic view illustrating the particular manner of assembling the rotor elements and holding them together.

In assembling the rotor a suitable number of iron laminae 15 are assembled side by side as shown in Fig. 5 with the slots 18 in registry. Then one copper ring 20 is placed on one side of the assembled laminae and the other copper ring on the other side. The teeth 22 of the one ring point in a direction opposite to that of the teeth in the other ring. As shown in Fig. 5 one copper ring 30 is placed on one side of the laminae and the arms 31 (21 in Fig. 3) are bent in over and around the edges of the laminae and pressed down into the slot 18. This one bending of the arm automatically places the tooth 32 of the arm (22 in Fig. 3) on the outside of the laminae on the opposite side so that the teeth of the laminae are clamped together between the said teeth 32 and the abutments 33 (23 in Fig. 3) and no further bending operation is required. The length of the arms 21 (31) between the tooth 22 (32) and the abutment 23 (33) is made slightly less than the thickness of the assembled laminae so that when the arm is bent down into the slot 18 the tooth of the arm will snap down over the opposite edge of the assembled laminae and thus clamp them together as will be understood.

Then the second copper ring is placed on the opposite side of the laminae and its arms are bent to occupy the alternate unoccupied slots 18. In Fig. 5 the second copper ring is marked 40, its arms 41, its teeth 42 and its abutments 43 to distinguish from the first copper ring.

The arms of the copper rings are bent in over the laminae occupying alternate slots 18 and the teeth on the laminae are clamped between the teeth and the abutments on the copper rings as shown in Fig. 5. Only one bending of the copper ring teeth is required and a better grip upon the laminae is obtained than when bending the ends of the arms a second time around the laminae such as is provided in some prior disclosures. A still further advantage is obtained in that there is a continuous ring of copper along the circular rim of the rotor as shown at the bottom of Fig. 5 to provide for a continuous path for the flow of the current and a more even flow.

Figure 7:
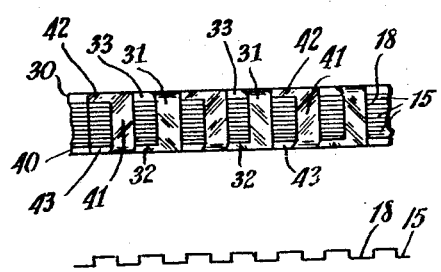
Fig. 7 shows a modification.
Figure 7:
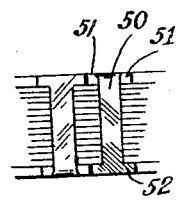

In the modification shown in Fig. 7 the copper arms 50 have an abutment 51 on each side at the base of the arm and the teeth 52 at the free end of the arm extends across the arm. The teeth on the laminae are clamped between the teeth and the abutments on adjacent arms.

I claim:

A rotor for a synchronous electric motor as described comprising a plurality of circular iron laminae and two outer identical copper rings, one on each side of the assembled laminae, said laminae having recesses in their rims forming spaced slots in the circumference of the assembled laminae axially thereof, each copper ring having outwardly extending radial arms including a tooth portion at the free end of each arm extending to one side of the arm and abutments formed in the rim integral with said arms at the bases thereof, said tooth portions and said abutments being radially alined on said rings, the tooth portions on one ring extending in a direction opposite to the tooth portions on the other ring, the arms of one of the copper rings being bent in one direction around the edges of the assembled laminae on the one side thereof and embedded in alternate slots in the laminae, the arms of the other copper ring being bent in the opposite direction around the edges of the assembled laminae on the other side thereof and likewise embedded in alternate slots in the assembled laminae, the tooth portions on each of said rings engaging the laminae on the opposite side in circumferentially alternate positions to clamp said laminae between said tooth portions and the said abutments.

JAY ROSE.